United States Patent [19]
Hamilton et al.

[11] 3,762,904
[45] Oct. 2, 1973

[54] PROCESS FOR BENIDNG A GLASS SHEET TO A RELATIVELY SHARP ANGLE

[75] Inventors: Harold E. Hamilton; Robert P. Bamford, both of Toledo; Paul V. Pastorek, Rossford, all of Ohio

[73] Assignee: Libbey-Owens-Ford Company, Toledo, Ohio

[22] Filed: Aug. 23, 1972

[21] Appl. No.: 283,076

Related U.S. Application Data

[63] Continuation-in-part of Ser. No. 135,564, April 20, 1971.

[52] U.S. Cl.................. 65/107, 65/DIG. 4, 65/40
[51] Int. Cl................................................ C03b 23/02
[58] Field of Search................. 65/40, 106, 107, 65/DIG. 4

[56] References Cited
UNITED STATES PATENTS
3,281,227   10/1966   Leflet, Jr. et al.............. 65/107
2,176,999   10/1939   Miller............................. 65/107

Primary Examiner—Arthur D. Kellogg
Attorney—Elmer L. Collins et al.

[57] ABSTRACT

A process for bending a glass sheet to a relatively sharp angle including forming a groove in a surface of the sheet along a line about which it is desired to bend the sheet, forming an electrically conducting path on the sheet, and passing an electric current through the path to heat the sheet in the area of the groove to a temperature above the bending point of the glass. The sheet is then caused to be bent along the groove to form a generally V-shaped glazing.

7 Claims, 11 Drawing Figures

PATENTED OCT 2 1973  3,762,904

PROCESS FOR BENIDNG A GLASS SHEET TO A RELATIVELY SHARP ANGLE

This application is a continuation-in-part of application SER. No. 135,564, filed Apr. 20, 1971.

The present invention relates generally to the bending of glass sheets or plates and more particularly relates to an improved method of bending glass sheets to relatively sharp angles.

Automobile stylists and designers have always been faced with the difficulty of incorporating glass into their designs. However, with the development of very sophisticated glass bending processes which have enabled the production of so-called cap and wrap-around windshields and backlights, many of the difficulties of maintaining the desired design through the glass portions have been eliminated. In this connection it is often desirable to shape or form the glass to carry out styling features found in the adjacent sheet metal panel in order to create the appearance of unity between the glass and the sheet metal. For example, it may be desirable to provide a generally vertically extending sharp bend in a windshield or backlight in continuation of a bead or molding strip on the surface of the hood, roof panel or deck lid. At times it may also be desirable to form a sharp bend in either a horizontal or vertical direction to affect wrap around of a windshield or backlight into the roof line of the vehicle or into the side surface thereof. Bends of this nature, i.e., V-bends or bends of very small radius of curvature, have remained extremely difficult to obtain.

It is, accordingly, an object of the present invention to provide an improved method of bending a glass sheet to a sharp angle.

Another object of the invention is the provision of a method of the above character in which distortion in the area of the bend is minimized.

It is a further object of the invention to provide a method of the type described which permits a more rapid bending of a glass sheet or sheets with greater economy and to sharper angles than with processes heretofore proposed.

Other objects and advantages of the invention will become more apparent during the course of the following description when taken in connection with the accompanying drawings.

In the drawings wherein like numerals are employed to designate like parts throughout the same:

Generally stated, the present invention provides a process for bending a glass sheet to a relatively sharp angle which comprises first forming a groove in at least one surface of a flat sheet of glass to be bent. This groove is made to extend continuously along a substantially straight line from one edge of the sheet to the opposite edge. An electrically conducting path is then formed either in the groove or in the other surface of the sheet directly opposite the groove. The glass sheet is preferably placed in or passed through a furnace in order to heat the sheet to an elevated temperature but below the temperature at which any significant bending of the glass takes place. An electric current is then passed through the electrically conducting path to heat the same by resistance and in turn heat the sheet in the area immediately adjacent the path and groove by conduction to a temperature above 1,000° F. or above its bending temperature. At this point, the sheet is caused to bend, for example, by gravity, along the path and groove to form a generally V-shaped structure.

Figure 1:
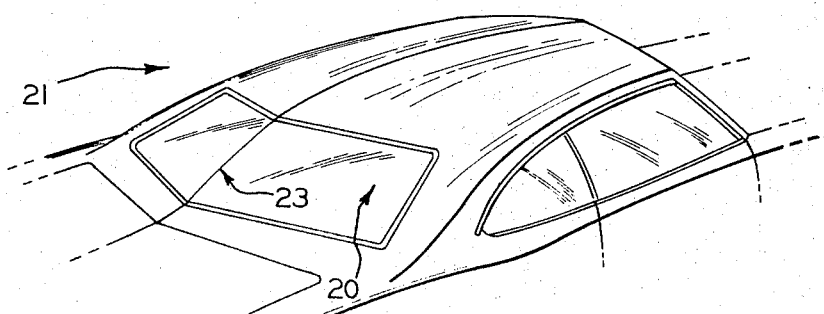
FIG. 1 is a perspective view of an automobile including a bent glass back window or backlight produced in accordance with the present invention.
Figure 2:
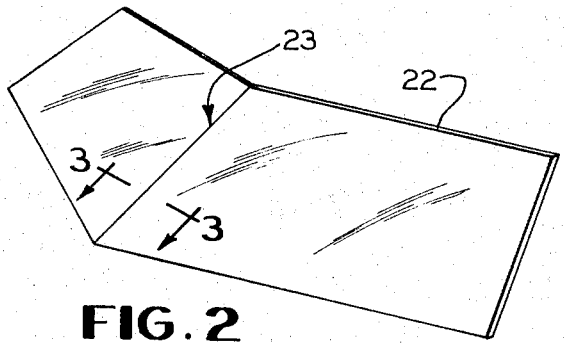
FIG. 2 is a perspective view of the backlight illustrated in FIG. 1.
Figure 3:
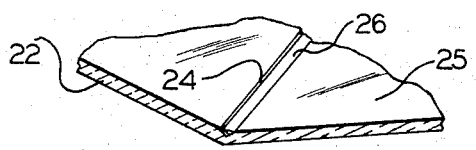
FIG. 3 is a sectional view taken along the line 3—3 of FIG. 2.

Referring now more particularly to the drawings, there is illustrated in FIG. 1 a backlight 20 produced in accordance with this invention as it appears from the outside of an automobile 21 in whcih which backlight is mounted. The backlight 20 is comprised of a single glass sheet 22 of V-shaped configuration, being bent along a straight line path indicated generally at 23 extending from one longitudinal edge of the glass sheet to the other immediate of and parallel to the transverse edges. The path or axis of the bend is defined by a groove 24 formed, in the particular embodiment illustrated, in the inboard surface 25 of the glass sheet, and a fired electrically conducting frit line 26 formed in the groove. The purpose and nature of the frit line or band 26 and groove 24 will subsequently be discussed in detail.

Figure 5:
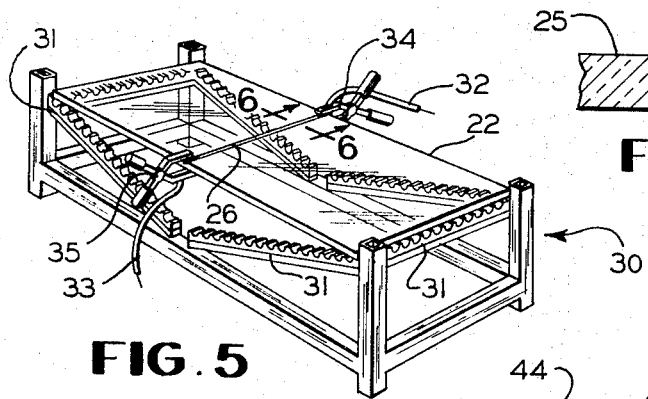
FIG. 5 is a perspective view showing a glass sheet in position on a mold prior to initiation of the bending portion of the process in accordance with this invention.
Figure 4:
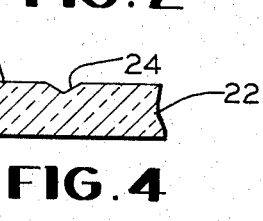
FIG. 4 is a sectional view of a glass sheet after the initial grooving step of the process.
Figure 7:
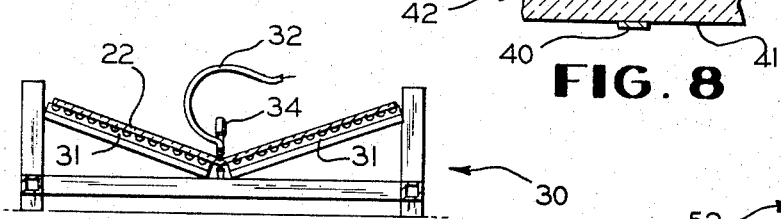
FIG. 7 is a sectional view showing the glass sheet supported on the mold upon the conclusion of the bending process.

The glass sheet 22 may be bent upon a ring or skeleton type mold indicated generally at 30 in FIGS. 5 and 7. Molds of this type are conventionally used for the bending of glass and have a peripheral rail 31, the top edge of which forms the shaping surface for forming the glass. In accordance with present day practice, the rail 31 may be either a substantially single piece stationary member as shown or formed of articulated sections which are moved during the bending of the glass from an open glass-receiving position to a closed, final position.

Prior to positioning the glass sheet on the bending mold 30, the groove 24 and the electrically conducting frit line 26 are formed thereon. The groove 24 may be formed by any well known glass cutting or abrading procedure such as by means of a suitably convexedly angled grinding wheel. The depth of the groove is dependent upon the thickness of the glass sheet 22 and to some extent the degree of angle to which it is to be bent. By way of example, in bending glass sheets approximately 0.200 inch to 0.250 inch thick, the depth of the groove may range from 1/32 inch to 3/32 inch.

It will of course be appreciated that the provision of a groove 24 in one or both surfaces of a glass sheet establishes a line of weakened resistance along which the sheet will tend to bend first when heated to bending temperature. Also, optical distortion is minimized by removing glass from the surface of the sheet in the area of the bend which reduces the magnitude of the compressive stress at the inner surface of the bend and thereby the tension at the outer surface of the bend.

After the groove 24 has been formed in the surface 25 of the glass sheet 22 the electrically conducting line 26 is formed therein. While various materials may be used to form these lines or resistance heating elements, preferred compositions comprise conductive metal pastes. These materials, sometimes also referred to as inks, are applied to the glass sheets by conventional silk screen processes, painting, or rolling, depending chiefly upon the depth of the groove and the necessity of obtaining a substantially uniform cross section along the length thereof, and then are heated or fired to fuse the material to the sheet.

Typically the pastes comprise conductive metal particles, e.g., silver, glass frit particles and organic binders and solvent. The glass frit in addition to fusing the heating elements or strips to the sheet, also serves as an extender by which the desired conductivity or resistivity is achieved in the paths or elements. In other words, for a given cross-sectional area of the elements, the silver, which imparts electrical conductivity thereto, can be diluted or extended with the glass frit to attain the desired resistance which in turn determines the heat developed in the groove path and glass immediately adjacent thereto.

A specific material which may be employed with good results is a silver paste containing approximately 80 percent by weight silver and 20 percent by weight glass frit and organic binders and solvent. This material has a resistance of approximately 4.5 ohms per foot at room temperature when applied to a glass sheet in a 0.030 inch wide line using a 160 mesh screen. In general, the conductive silver pastes may be fired at temperatures between 800° F. and 1,400° F. with the organic binders and solvents being burnt off at these temperatures.

Although the conductive silver pastes are ideally suited for forming the electrically conducting elements, other conductive metal pastes may be used, e.g., those containing gold, palladium, platinum, and alloys thereof. In addition, air drying dispersions of conducting metals may be employed, as well as graphite, silver-graphite mixtures or substantially any other material which is an electrical conductor at the temperatures involved.

Figure 6:
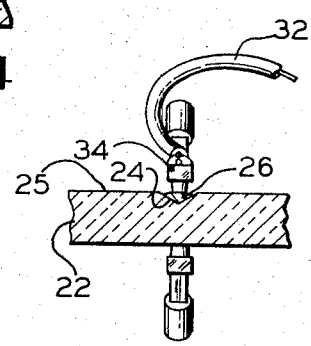
FIG. 6 is a sectional view taken along the line 6—6 of FIG. 5.

After the electrically conducting line or element 26 has been satisfactorily laid down, the glass sheet 22 is positioned on the bending mold by supporting the transverse edges of the sheet on the shaping surface of the mold (FIG. 5). Leads 32 and 33 from a suitable electrical power source (not shown) are then placed in electrical contact with the line 26 through alligator clips or the like 34 and 35 respectively (FIGS. 5 and 6).

Prior to supplying power to the leads 32 and 33 the bending mold and glass sheet carried thereby are preferably heated to a relatively high temperature, for example, above the strain point of the glass but below the bending point or the temperature at which the glass bends to any significant degree. In this respect, temperatures in the range of approximately 900° F. to 1,150° F. have been found useful. This heating may suitably be accomplished by conveying the mold through a furnace. The purpose of this preliminary heating treatment is to prevent inducing permanent stresses in the glass, obviate the tendency of the glass to crack when it is subsequently heated locally along the electrically conducting line to its bending temperature, and also to enable the accomplishment of this latter step in a time which is acceptable from a commercial standpoint and with the use of a reasonable amount of electrical energy.

Upon the glass sheets reaching the desired over-all temperature, power is supplied to the leads 32 and 33 and consequently to the element 26. This in turn heats the glass sheet immediately adjacent and underlying the element and groove to a temperature above the bending temperature of the glass, for example, above approximately 1,200° F., at which time the sheet bends sharply along the path 23 and settles by gravity into the generally V-shaped configuration illustrated in FIG. 7. The sheet is then cooled to room temperature.

As a specific example of producing the backlight 20 or bending any glass sheet into a generally V-shaped structure in accordance with the method of the invention, a glass sheet of nominal 0.250 inch thickness was procured. A V-shaped groove ⅛ inch wide at the top and 1/32 inch deep was cut in the sheet intermediate two opposed edges thereof and parallel thereto with a diamond saw. A composition comprised of 85% by weight of a conductive silver preparation, i.e., composed of silver particles, solvent binder and frit, marketed by E. I. duPont deNemours & Co. under the designation "8375" and 15% by weight of duPont conductive material "8151" comprising both silver and palladium particles was then applied to the groove throughout the length thereof and to a depth to substantially fill same. The groove, which extended completely between the other or longitudinal edges of the sheet, was 20 inches in length.

This sheet was supported at the said two opposed or transverse edges only on a mold and heated in a furnace set to a temperature of 1,150° F. During this heating, the finely-divided metal ceramic frit fuses onto the glass surfaces defining the groove. The glass and integral frit line were then allowed to cool to room temperature and electrical connections such as shown in FIGS. 5, 6 and 7 were made to the frit line and the mold-supported sheet again placed in the furnace and the furnace heated to a temperature of 1,150° F. When this temperature was obtained, electrical energy was supplied to the frit line and, more particularly, a current of 10 amperes passed therethrough. This current was supplied for 1 minute at which time the sheet had assumed a generally V-shape appearance, the bend occurring at and along the groove and firt line. The sheet was then removed from the furnace and cooled quickly to produce a tempered structure.

It should be noted that it is not necessary that the sheet be allowed to cool down after firing of the frit and then reheated for the bending step. The electrical connections may be made prior to the firing and this step accomplished during heating of the sheet to the bending temperature.

Another conductive paste which may be successfully employed in embodiments similar to that discussed above is obtained from the Drakenfeld Company, a division of Hercules Chemical Company, under the designation "Drakenfeld Conductive Silver Paste A–942." This is a silver metal, organic binder and glass frit composition containing in the range of from 75 percent to 80 percent by weight silver.

Figure 8:
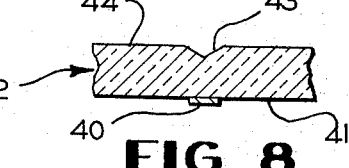
FIG. 8 is a sectional view of a glass sheet to be bent in accordance with another embodiment of the invention.

FIG. 8 illustrates an embodiment of the invention wherein an electrically conducting frit line 40 is applied to a surface 41 of a glass sheet 42 directly opposite a groove 43 cut into the other surface 44 of the sheet. In this embodiment, as in all the others discussed herein, the glass sheet may be placed on the bending mold with either surface facing upwardly.

While there is no significant advantage to this embodiment over, for example, that illustrated in FIGS. 1 to 7, it does enable a somewhat more accurate application of the frit line since a silk screen printing process can be more easily employed. In this connection, application of the frit line to a groove may require, depending upon the depth of the groove, the use of a brush or roller applicator which tends to be somewhat less precise.

Figure 9:
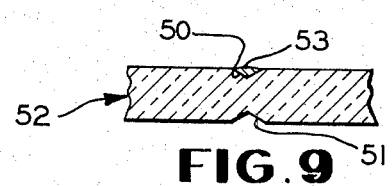
FIG. 9 is a sectional view of a glass sheet to be bent to a sharp curvature in accordance with still another embodiment of the invention.
Figure 10:
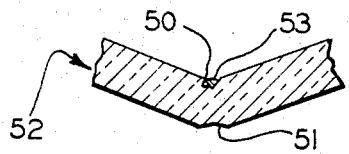
FIG. 10 is a sectional view of the glass sheet of FIG. 9 after the bending step.

FIGS. 9 and 10 illustrate a further embodiment of the invention wherein grooves 50 and 51 are provided on both surfaces of a glass sheet 52 directly opposed to each other. An electrically conducting frit element 53 is applied to one of the grooves which, in the particular case illustrated, is the groove 50. The structure of this embodiment enables rapid bending and significantly low distortion due to the relatively small amount of glass mass at the "V" but also results in higher costs because of the multiple grooving. This configuration is particularly well adapted for use in bending relatively thick glass, i.e., glass over ¼ inch thick.

Figure 11:
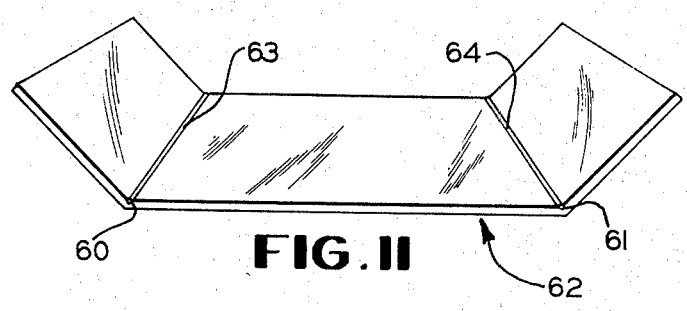
FIG. 11 is a perspective view showing a glass sheet glazing unit including two sharp bends produced in accordance with the invention.

FIG. 11 illustrates an embodiment of the invention wherein a generally U-shaped or channel shaped glazing is desired. Thus two grooves 60 and 61 are provided in the glass sheet 62, and electrically conducting frit lines 63 and 64, respectively, formed in these grooves. The method of bending the unit of FIG. 11 is identical to that employed in the unit of FIGS. 1 to 7 except that a mold satisfactory for bending a generally U-shaped structure is employed and two pairs of electrical connectors used.

While the apparatus specifically illustrated herein for use in the method of the invention consists of gravity type bending molds, it is also possible to use press bending apparatus if desired without altering the method.

The principal advantage of using grooved glass in accordance with the method of the invention rather than ungrooved glass and only a frit line or other electrically conducting material applied to the sheet is that less glass is heated at the "V" with the grooved glass which results in less distortion, sharper bends, faster bending and if desired a lower power consumption.

As previously noted, to obtain a "V" bend the glass adjacent the groove and electrically conducting element must attain a temperature above 1,000° F., preferably a temperature in the range from 1,200° F. to 1,350° F., and the areas of the glass sheet other than those immediately adjacent the path of bend should not obtain bending temperature. However, it should be pointed out that after the "V" bend is obtained, cross bend can be introduced into the sheet for aesthetic purposes by raising the over-all temperature.

We claim:

1. A process for bending a glass sheet to a relatively sharp angle, comprising forming a groove in a surface of a sheet along a line about which it is desired to bend the sheet, forming an electrically conducting path on the ungrooved surface of the sheet directly opposite said groove, applying an electrical potential across said path of a sufficient magnitude and for a time adequate to heat the sheet in the area of the groove to a temperature above the bending point of the glass, and causing said sheet to bend along said groove to form said relatively sharp angle therein.

2. A process for bending a glass sheet as defined in claim 1, wherein said sheet is heated to an elevated temperature but below the bending temperature of the glass after forming said path but prior to the application of said electrical potential thereto.

3. A process for bending a glass sheet to a relatively sharp angle, comprising forming a groove in a surface of a flat sheet of glass to be bent, forming an electrically conducting path in said groove, heating the sheet to an elevated temperature but below the bending temperature of the glass, passing an electrical current along said electrically conducting path to heat the sheet in the area of the groove to a temperature above the bending point of the glass, and causing said sheet to bend along said groove to form said relatively sharp angle therein.

4. A process for bending a glass sheet as defined in claim 3, wherein said sheet is heated to a temperature in the range of from 900° F. to 1,150° F. prior to passing said electrical current along said path.

5. A process for bending a glass sheet as defined in claim 3, wherein said electrically conducting path is produced by stenciling an electrically conducting metal and frit containing paste on the glass surface.

6. A process for bending a glass sheet to a relatively sharp angle, comprising forming a groove in a surface of a flat sheet of glass to be bent, which groove extends continuously along a line from substantially one edge of the sheet to the opposite edge thereof, forming an electrically conducting path in said groove, heating the sheet to an elevated temperature but below the bending temperature of the glass, passing an electrical current along said electrically conducting path to heat the sheet in the area of the groove to a temperature above the bending point of the glass, and causing said sheet to bend along said groove to form said relatively sharp angle therein.

7. A process for bending a glass sheet to a relatively sharp angle, comprising forming a groove in a surface of a flat sheet of glass to be bent, which groove extends continuously along a substantially straight line from one edge of the sheet to the opposite edge therof, forming an electrically conducting path in said groove by supplying an electrically conducting metal-containing glass frit suspension thereto, supporting the flat sheet along a portion of its marginal edge only above a shaping surface of a bending mold, heating the sheet to a temperature above the strain point of the glass but below the bending temperature thereof to fuse the metal-glass frit suspension to the glass, applying an electrical potential across the fused path of a sufficient magnitude and for a time adequate to raise the temperature of the glass in the area immediately adjacent said groove to its bending temperature, and causing the sheet to bend by gravity along said groove into conformity with the shaping surface of the mold.

* * * * *